G. C. LEDERER.
FOLDING SUPPORT FOR AUTOMOBILE BEDS.
APPLICATION FILED DEC. 30, 1919.

1,360,961.

Patented Nov. 30, 1920.

WITNESS

INVENTOR
George C. Lederer

UNITED STATES PATENT OFFICE.

GEORGE C. LEDERER, OF PORTLAND, OREGON.

FOLDING SUPPORT FOR AUTOMOBILE-BEDS.

1,360,961. Specification of Letters Patent. Patented Nov. 30, 1920.

Application filed December 30, 1919. Serial No. 348,283.

*To all whom it may concern:*

Be it known that I, GEORGE C. LEDERER, a citizen of the United States, residing at Portland, in the county of Multnomah and State of Oregon, have invented certain new and useful Improvements in Folding Supports for Automobile-Beds, of which the following is a specification.

This invention relates to a new and useful improvement in folding supports for automobile beds, whereby the camper, the tourist or other parties can quickly and easily provide themselves with sleeping accommodations.

The object of this invention is to provide a support of this kind which can be readily placed in position for use in an automobile and as readily taken down, folded into a small space, weighing but a few pounds and be conveniently carried in the machine.

Another object of this invention is to provide a support of this kind, assembled as one, thereby eliminating the possibility of losing a part thereof.

Another object of this invention is to provide a means whereby the cushions of the automobile may be utilized as part of the bed.

Other specific objects will appear in the subjoined description.

This invention consists in certain particular features of construction and application, hereinafter described and claimed, reference being had to the accompanying drawings.

Like numerals designate corresponding parts in all of the figures of the drawings.

The principal parts of the invention are the cross member 1 hinged in the center, cushion support members 2 and a leg member 3.

The cross member 1 and the cushion support members 2, are made preferably of channel iron to insure strength and to provide the minimum of weight.

The leg member 3, is made of hollow tubing, likewise for strength and lightness.

Figure 1:
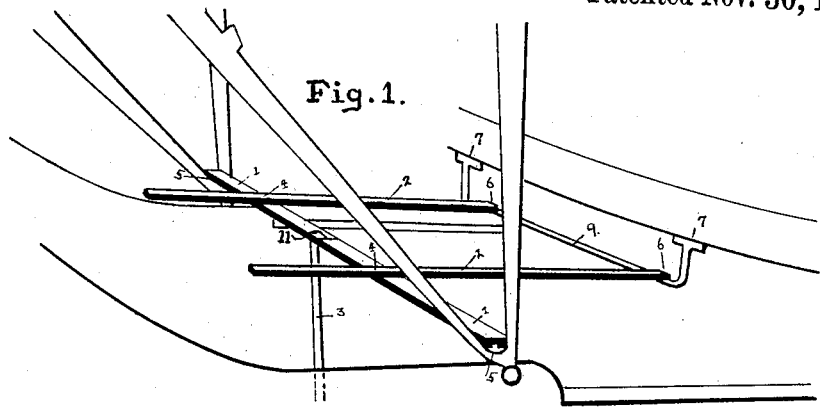
Figure 1 is a section of the rear compartment or tonneau of an automobile showing the application of this invention.

The cross member 1, to which are pivoted at 4 the cushion support members 2, is placed in the crotches formed by the rear top bow sockets at 5. The cushion support members 2, are turned at right angles to the said cross member, to engage at 6 with a robe rail 9, said robe rail being fastened to the trim rail of the front seat at 7. The engaging end of the said cushion support members at 6, are provided with a U-shaped block 8, to hold the same in place. The cross member 1, is also provided with stops 10, to keep this member in position. The leg member 3, is riveted into hinge 11 and drops into position on the lid of the rear seat or the ledge of the heel board. The foregoing all as shown in the drawings, Fig. 1.

Figure 2:
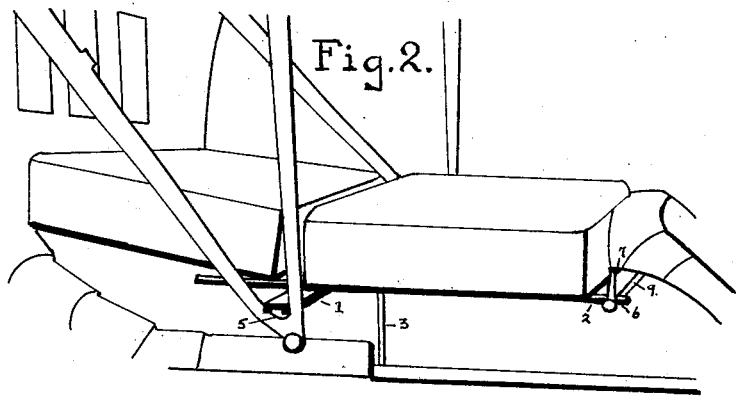
Fig. 2 is a similar section showing the position of the automobile cushions as supported by this invention.
Figure 3:
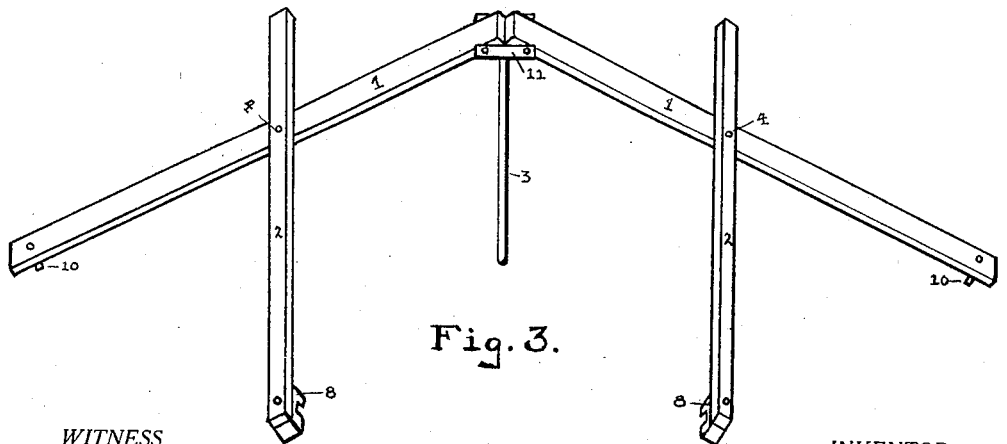
Fig. 3 is a perspective of the invention itself.

To use the bed support, remove the cushions from the automobile, turn the cushion support bars on the device to a position at right angles with the closed cross bar, open the cross bar and drop same into the crotches of the rear top bow sockets and engage the U-shaped blocks at the end of the cushion support bars over the robe rail. Place the rear seat cushion on the cushion support members immediately back of the rear of the front seat and the front seat cushion back of this, one edge resting on the cushion support members, the other edge on the upholstering of the back of the rear seat, all as shown in the drawings, Fig. 2.

To complete the bed, a canvas sheet (not shown) is furnished, to be fastened at the head end to the top prop rest arms and at the foot end to the windshield hinges.

To take down the bed, remove the canvas sheet, then the cushions, grasp the bed support at the hinge and lift it out of the automobile. The device will collapse due to its construction into a very small bundle.

It will be seen from the foregoing description that this invention is a simply constructed, collapsible, automobile bed support, durable and light and being such, can be manufactured and marketed at an approximately low cost.

It must be understood that there are slight differences in the shape of cross member 1, in order that this invention may be adapted to different sizes and models of automobiles.

I claim as my invention:

1. A folding automobile bed support for supporting the cushions of automobiles, comprised of hinged bars extending across the rear seat and resting in the crotches formed on either side by the rear top bow sockets, to which hinged bars, pivoted at the proper distance apart are two shorter bars, the ends of which are supported by a robe rail fastened to any part of the rear of the front seat.

2. A folding support for supporting the cushions of automobiles, comprised of hinged bars extending across the rear seat and resting in the crotches formed on either side by the rear top bow sockets, a means for stabilizing said hinged bars at the hinged point, said bars having pivoted thereto at the proper distance apart two shorter bars, and a means of engaging the ends of said two shorter bars at the rear of the front seat.

In testimony whereof I affix my signature in the presence of two witnesses.

GEORGE C. LEDERER.

Witnesses:
  W. T. LOVELL,
  LOUIS REGULA.